Figure 1:
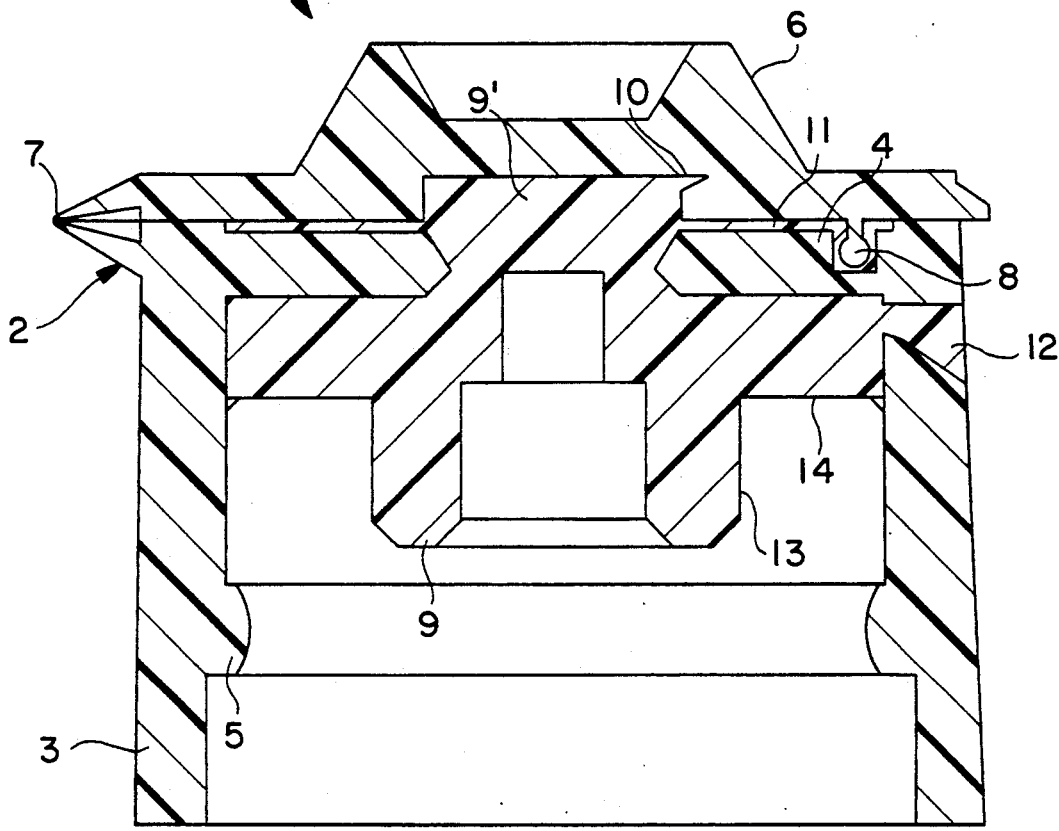

United States Patent [19]

Wijnschenk

[11] Patent Number: 5,111,948
[45] Date of Patent: May 12, 1992

[54] CAP ASSEMBLY AND METHOD FOR PRODUCING SUCH AN ASSEMBLY

[75] Inventor: Ronald J. C. Wijnschenk, Lelystad, Netherlands

[73] Assignee: Microplast B.V., Lelystad, Netherlands

[21] Appl. No.: 613,808

[22] PCT Filed: Jun. 27, 1989

[86] PCT No.: PCT/NL89/00053
§ 371 Date: Dec. 28, 1990
§ 102(e) Date: Dec. 28, 1990

[87] PCT Pub. No.: WO90/00143
PCT Pub. Date: Jan. 11, 1990

[30] Foreign Application Priority Data

Jun. 28, 1988 [NL] Netherlands .................. 8801643

[51] Int. Cl.5 .................. B65D 55/16; B65D 41/28
[52] U.S. Cl. .................. 215/306; 215/247; 215/263; 215/320
[58] Field of Search .............. 215/306, 211, 212, 213, 215/216, 247, 249, 263, 320; 264/268

[56] References Cited

U.S. PATENT DOCUMENTS

| 579,013 | 3/1897 | Schenker | 215/263 X |
|---|---|---|---|
| 1,295,240 | 2/1919 | Unruh | 215/213 |
| 3,499,568 | 3/1970 | Riera | 215/247 X |
| 3,756,445 | 9/1973 | Hedgewick | 215/211 X |
| 3,871,545 | 3/1975 | Béréziat | 215/249 |
| 4,187,893 | 2/1980 | Bujan | 215/247 X |
| 4,431,110 | 2/1984 | Roth | 215/213 |
| 4,482,069 | 11/1984 | Stadler | 215/249 |
| 4,573,602 | 3/1986 | Goldberg | 215/256 |
| 4,772,558 | 9/1988 | Hammann | 215/247 X |
| 4,893,734 | 1/1990 | Chlystun | 215/216 X |

FOREIGN PATENT DOCUMENTS

| 0079676 | 5/1983 | European Pat. Off. . |
| 0085360 | 8/1983 | European Pat. Off. . |
| 3519655 | 12/1986 | Fed. Rep. of Germany . |

Primary Examiner—Stephen Marcus
Assistant Examiner—Vanessa Caretto
Attorney, Agent, or Firm—Young & Thompson

[57] ABSTRACT

In a cap assembly (1, 15) for a container, comprising an easily deformable plug member (9, 21) and a neck member (3, 16) having an opening. The neck member is adapted to cover an upper part of a container neck and partially covers the plug member (9, 21). A cover member (6, 19) is provided for the plug member (9, 21). This cover member (6, 19) is provided with a cavity (10, 22), which at least on one location increases in its cross section in the direction of opening. A locking memb4er (9', 23) is engagable positioned within the cavity (10, 22) centrally of the cap assembly. This locking member (9', 23) consists of an easily deformable material which is secured to the neck member and is cast in and so shapematingly engages in the cavity. As a result, the locking member (9', 23) can be pulled from the cavity but cannot be reinserted into the cavity. This provides an indication whether anyone has tampered with the conainer.

8 Claims, 1 Drawing Sheet

CAP ASSEMBLY AND METHOD FOR PRODUCING SUCH AN ASSEMBLY

DESCRIPTION

This invention relates to a cap assembly for a container, comprising an easily deformable plug member and a neck member having an opening, said neck member covering the upper part of the container neck and partially covering said plug member and a cover member for said plug member.

Such an assembly is known from DE-A-3 519 655. In this assembly between the covering member and the neck portion foil sheet is arranged. A plug member is provided with a cavity to introduce a protrusion of the cover member. Except from being complicated by the further foil member the cap assembly according to this specification has the drawback that after removing of cover member, this member can be replaced without any indication of being opened, because the foil sheet is permanently removed. This means that there is no clear evidence that there might be tampered with the contents of the container. Such assemblies are e.g. used in infusion bottles. With these bottles a part of the aluminium foil is removed and the rubber plug is pierced by an injection needle or spike to remove the contents. A further drawback are the several steps needed to place the cap assembly on a container.

The invention aims to obviate these drawbacks. According to the invention this is realized in that said cover member is provided with a cavity, which at least on one location increases in its cross section in the direction of opening, a locking member being engagably positioned within said cavity said locking member consisting of an easily deformable material which is connected to said neck member. By introducing, in the locked position of the cover member, the material of the locking member in a non-releasing cavity, is possible to obtain an indication showing whether the cover member has been released. By the easily deformable nature of the material of the locking member the cover member can be opened. However, after this it is impossible to close the cover member to the original position. Such an indication is of considerable importance with many applications of the cap assembly according to the invention. Examples are a guarantee that after filling of the bottle the cover member has not been opened and the locking member, which has to be pierced by an injection needle, is sterile.

EP-A3-0 085 360 discloses a deformable plug member having a cover such as a removable ring. In the plug guiding recesses are provided to guide an infusion needle in the plug. The plug comprises an insert part being filled with filling material. The plug is inserted in the opening of a container. In contrast to the subject application no neck portion is provided having an opening cooperating with a cavity in the cover member to provide an indication whether or not the cap assembly has been opened. According to a preferred embodiment of the invention the locking member and the plug member comprises an integrally formed part. According to a further preferred embodiment the locking member provides the seal between the cover member and the neck portion. The cover member and the neck member can be simply realized as one part connected through a film hinge. To further secure the position of the cover member with regard to the cap assembly snap means can be provided. As material for the plug member and/or the locking member thermoplastic rubber are preferred. Both materials have the property of being non-toxic, so that a cap assembly embodying these materials can be used for all kinds of pharmacological applications. The cap assembly described above can be provided as a part which can be connected to a container in one simple step.

The invention also relates to a method for producing a cap assembly for a container, comprising an easily deformable plug member and a neck member having an opening, said neck member covering the upper part of the container neck and partially covering said plug member, and a cover member for said plug member, wherein a locking member is injection moulded into a cavity which is provided in said cover member, said cavity having at least at one location a cross section which increases in the direction of opening thus enabling said locking member to be lockingly engaged within said cavity and to be connected to said neck member. After providing the neck member with the cover member in position by injection molding the locking member is provided. It is of course also possible in the embodiment wherein the locking member and plug member are integrally formed to also form the plug member in the same step by injection moulding.

Figure 2:
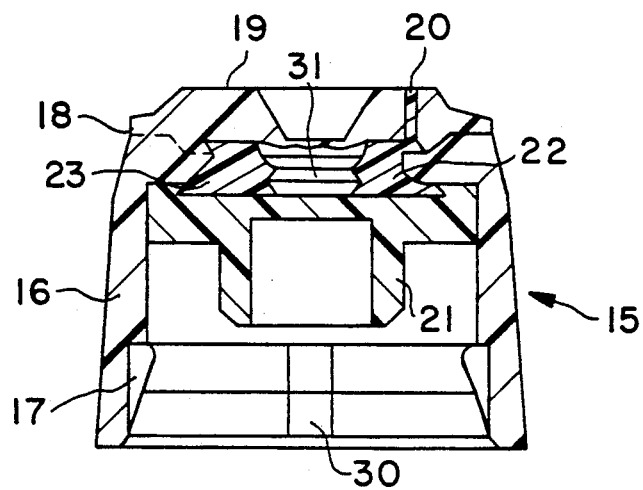

The invention will now be further elucidated referring to the drawing in which different embodiments are shown, and wherein:

FIG. 1 shows a cross section through the first embodiment of a cap assembly according to the invention: and FIG. 2 shows a cross section through a further embodiment of the invention.

The cap assembly as shown in FIG. 1 is generally indicated with 1 and comprises a cap member 2 having a sleeve 3 and collar 4. Sleeve 3 is provided with a protruding part 5 for connection to a container not shown. Integrally formed with cap member 2 cover member 6 is provided. Connection is realized by hinge 7. Cover member 6 is connected to cap member 2 at the side opposite to the hinge 7 through usual snap means 8. The cap member together with the cover member is realized from material withstanding elevated temperature. After realizing cap member 2 in the way shown in this drawing with means not shown a deformable material, such as polysiloxane material is injected to provide plug member 9 having integrally formed a locking member 9'. This material penetrates in cavities 10 and 11. Cavity 10 is shaped non-releasable, i.e. cover member 6 cannot be removed from cap member 2 without deformation of the material of locking member 9' part of plug member 9 being within cavity 10. This results in that after opening of the cover member it is not possible anymore to close this cover member 6 because the protruding part of the plug member prevents this. Cavity 11 is filled during realizing of plug member 9 such as by injection moulding, with the same material such that sealing between cover member 6 and cap member 2 is provided. Injection of plug member 9 is provided from injection opening 12. Apart from filling the above-mentioned cavities sealing surfaces 13 and 14 are realized with regard to the container. By suitable choice of the material of this plug member it is possible to introduce an injection needle by piercing after cover member 6 is opened. If cover member 6 is opened the exposed surface of plug member 9 is sterile. This is in contrast to prior art devices using an aluminium sheet cap. If the injection needle does not have a too large diameter it is also possible after its retraction to again provide a sealing by the resilient properties of the material of plug member 9. A material withstanding elevated temperatures for forming cap member 2 is a polyester material. If silicone material is used for the plug member during and after injection heat is supplied to crosslink the silicone material and as post treatment to remove free silicones which might have undesired properties.

In FIG. 2 a further embodiment of the cap assembly according to the invention is shown generally indicated with 15. Also this cap assembly comprises a neck portion 16 provided with protrusions 17 and with aeration channels 30 extending in vertical direction of the neck portion to aerate the part of the container between the protrusion 17 and the sealing site of the cap assembly to the outside part of the container.

Linked through a film hinge 18 cover member 19 is provided. Cover member 19 has an opening 20. In contrast to the first embodiment of the invention stopper 21 does not extend up to cavity 22 in cover member 19. As with the embodiment of FIG. 1 cavity 22 is shaped such that after it is filled with material it can only be opened and not be closed because of the presence of easily deformable material indicated with 23. In this embodiment it is possible to provide stopper 21 as a separate part which is introduced in member 16 after which through opening 20 material is injected for providing a guarantee against opening of cover member 19. Member 23 can comprise material such as thermoplastic rubber. In this embodiment of FIG. 2 cover member 19 is provided with a ring-shaped extension 31. This extension 31 is surrounded by material 23. After removing of cover member 19 a needle has only to be pierced through stopper 21.

Although the invention is described with reference to the preferred embodiments it has to be understood that changes can be introduced without leaving the scope of protection as defined in the appending claims.

I claim:

1. In a cap assembly (1, 15) for a container, comprising an easily deformable plug member (9, 21) and a neck member (3, 16) having an opening, said neck member being adapted to cover an upper part of a container neck and partially covering said plug member (9, 21), and a cover member (6, 19) for said plug member (9, 21); the improvement wherein said cover member (6, 19) is provided with a central cavity (10, 22), which at least on one location increases in its cross section in the direction of opening, a locking member (9', 23) being engagably positioned within said cavity (10, 22), said locking member (9', 23) consisting of an easily deformable material which is secured to said neck member and shapematingly engages in said cavity, whereby said locking member (9', 23) can be pulled from said cavity but cannot be reinserted into said cavity.

2. Cap assembly according to claim 1 wherein said locking member and plug member comprise an integrally formed part.

3. Cap assembly according to claim 1 wherein said locking member provides a seal between the cover member (6,19) and the neck member (3,16).

4. Cap assembly according to claim 1 wherein the neck member (3,16) and cover member (6,19) are formed integrally and connected through a film hinge (7,18).

5. Cap assembly according to claim 1 wherein the neck member (3) and cover member (6) are connected by snap means (8).

6. Cap assembly according to claim 1 wherein at least one of said plug member (9,21) and said locking member (9',23) consists of a thermoplastic rubber material.

7. Cap assembly according to claim 1, wherein said easily deformable material is a hardened material which has been injection molded in said cavity with said cavity serving as a mold therefor.

8. A method for producing a cap assembly (1, 15) for a container which comprises producing an easily deformable plug member (9, 21) and a neck member (3, 16) having an opening, said neck member being adapted to cover an upper part of a container neck and partially covering said plug member (9, 21), and providing a cover member (6, 19) for said plug member (9, 21); the improvement wherein a locking member (9', 23) disposed centrally of said cap assembly is injection moulded into a cavity which is provided in said cover member, said cavity having at least at one location a cross section which increases in the direction of opening thus enabling said locking member to be lockingly engaged within said cavity and to be secured to said neck member, whereby said locking member (9', 23) can be pulled from said cavity but cannot be reinserted into said cavity.

* * * * *